E. F. SWANSON.
CORN HANGER.
APPLICATION FILED MAR. 19, 1909.
935,562.
Patented Sept. 28, 1909.
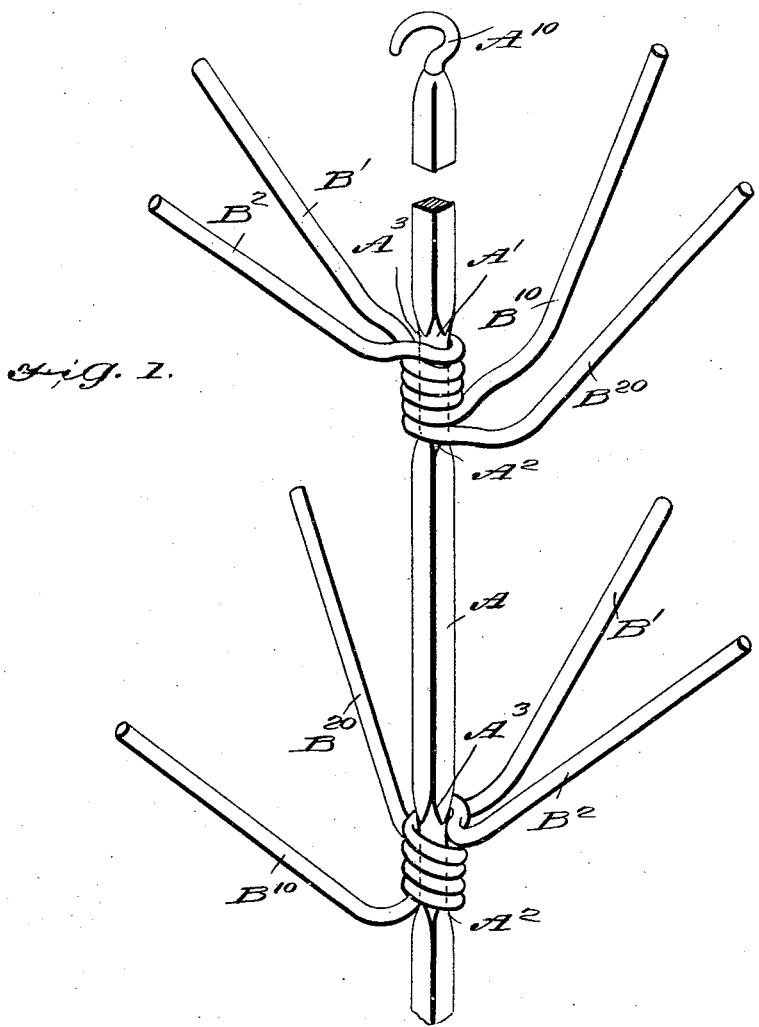
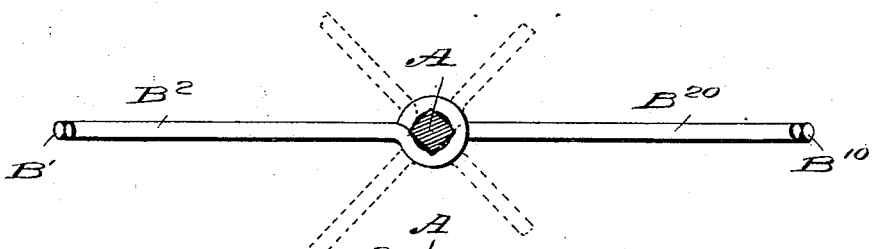
WITNESSES
INVENTOR
EMIL F. SWANSON
BY Munn & Co
ATTORNEYS

UNITED STATES PATENT OFFICE.

EMIL F. SWANSON, OF GALESBURG, ILLINOIS.

CORN-HANGER.

935,562.  Specification of Letters Patent.  Patented Sept. 28, 1909.

Application filed March 19, 1909. Serial No. 484,453.

*To all whom it may concern:*

Be it known that I, EMIL F. SWANSON, a citizen of the United States, and a resident of Galesburg, in the county of Knox and State of Illinois, have made certain new and useful Improvements in Corn-Hangers, of which the following is a specification.

This invention is an improvement in corn hangers or devices for hanging or supporting ears of corn for use as seed corn or otherwise; and the invention consists in certain novel constructions and combinations of parts as will be hereinafter described and claimed.

In the drawing Figure 1 is a perspective view of a portion of a corn hanger embodying my invention. Fig. 2 is a cross section showing the sections adjusted into the same plane for convenience in shipment or storage, and Fig. 3 is a detail perspective view showing a pair of brackets adjusted into the same plane.

In the construction shown the hanger comprises a rod A and brackets mounted thereon and adapted to receive the ears of corn by entering the cores of the ears thus impaling the ears as will be understood from the drawing.

It is preferred to provide the rod A with six sets of brackets, only two being shown in Fig. 1, but manifestly, the number may be varied without departing from some of the principles of the invention.

The rod A as shown, is angular in cross section but is cut down to round bearings at A' at intervals to form bearings or seats for the brackets which consist of upper arms B' and B²; and lower arms B¹⁰ and B²⁰ which incline upwardly so ears of corn may be impaled on their free ends as shown. In providing the brackets, the wires are coiled about the round bearing portions of the rod thus turning thereon so the bracket arms may be turned into the same plane as shown in Fig. 2 for convenience in storage or shipment, or can be opened as shown in Fig. 1, to space the arms B¹⁰ and B²⁰ apart, and arms B' and B² apart to adapt them to properly receive the ears of corn.

As shown, the brackets are arranged in pairs, and consist of two wires loosely wound at their middle portions side by side around the round part, or bearings, usually two full turns, with their free ends bent upwardly to receive the ears of corn, and when in use the brackets are turned on the round portions to space apart the adjacent arms as before described, and as they are pulled apart to this cross form they bind upon the tapered ends A² and A³ of the round bearing portions and thus tighten themselves in position.

A hook A¹⁰ is provided at the upper end of the rod A for convenience in suspending the same.

I claim—

1. A corn hanger comprising a rod having at intervals circular bearing portions with tapered ends, and a pair of bracket wires coiled at their middles about the bearing portions, and having their ends extended and adapted to receive ears of corn, the coils being adapted to rotate upon the bearing portions whereby they may be adjusted when opened to bind upon the tapered parts at the ends of the round bearing portions substantially as set forth.

2. A corn hanger comprising a rod having bearing portions and brackets coiled between their ends along said bearing portions and adapted to rotate thereon, and having their opposite ends extended and adapted to receive ears of corn, substantially as set forth.

3. The combination in a corn hanger with a rod, of brackets coiled at their middles together and around the rod and having their ends extended and adapted to receive ears of corn, substantially as set forth.

4. A corn hanger consisting of two wires loosely wound side by side and together around the rod and having their ends extended and adapted to receive ears of corn, substantially as set forth.

5. A corn hanger comprising a rod having a round bearing portion, and brackets having portions intercoiled with each other and coiled around the round bearing portion of the rod, and having extended arms adapted to support ears of corn substantially as set forth.

6. A corn hanger comprising a rod having a reduced portion, and a pair of brackets having coiled portions on the reduced portion and operating when moved in opposite directions to bind at the ends of the reduced portion.

7. A corn hanger comprising a rod, and a pair of brackets having coiled portions on the rod and operating when moved in opposite directions to bind at the ends of the coiled portions in connection with the rod, substantially as set forth.

EMIL F. SWANSON.

Witnesses:
P. D. DUFF,
FRED PELUSER.